United States Patent
Wang et al.

(10) Patent No.: US 7,972,416 B2
(45) Date of Patent: Jul. 5, 2011

(54) METHOD AND APPARATUS FOR HUMIDIFYING AIR WITH WATER VAPOR EXTRACTED FROM MOISTURE-LADEN FLUE GAS

(75) Inventors: Dexin Wang, Indian Creek, IL (US); William E. Liss, Libertyville, IL (US); Richard A. Knight, Brookfield, IL (US)

(73) Assignee: Gas Technology Institute, Des Plaines, IL (US)

( * ) Notice: Subject to any disclaimer, the term of this patent is extended or adjusted under 35 U.S.C. 154(b) by 565 days.

(21) Appl. No.: 12/033,314

(22) Filed: Feb. 19, 2008

(65) Prior Publication Data
US 2009/0205490 A1    Aug. 20, 2009

(51) Int. Cl.
*B01D 53/22* (2006.01)
(52) U.S. Cl. ................ 95/52; 95/43; 95/45; 55/DIG. 17
(58) Field of Classification Search ................ 95/43, 45, 95/52; 55/DIG. 17
See application file for complete search history.

(56) References Cited

U.S. PATENT DOCUMENTS

| | | |
|---|---|---|
| 3,735,559 A | 5/1973 | Salemme |
| 3,926,561 A * | 12/1975 | Lucero ........................ 436/178 |
| 3,980,605 A | 9/1976 | Steigelmann et al. |
| 4,583,996 A | 4/1986 | Sakata et al. |
| 4,875,908 A | 10/1989 | Kikukawa et al. |
| 5,236,474 A | 8/1993 | Schofield et al. |
| 5,738,023 A | 4/1998 | Mennink |
| 5,753,009 A | 5/1998 | Sirkar et al. |
| 6,413,298 B1 | 7/2002 | Wnek et al. |
| 6,517,607 B2 | 2/2003 | Rabovitser et al. |
| 7,066,396 B2 | 6/2006 | Knight et al. |
| 2006/0147773 A1 | 7/2006 | Steinshnider et al. |

* cited by examiner

*Primary Examiner* — Jason M Greene
*Assistant Examiner* — Anthony Shumate
(74) *Attorney, Agent, or Firm* — Mark E. Fejer

(57) ABSTRACT

A method and apparatus for humidifying air in which the first side of a permselective water transport membrane is contacted with water vapor laden flue gas from a combustion process having a first water vapor partial pressure and a first temperature and at least a portion of the water vapor is condensed, producing condensed water. The condensed water is transported through the membrane to the opposite side of the membrane, which is contacted with an air stream having a second water vapor partial pressure, which second water vapor partial pressure is less than the first water vapor partial pressure, and having a second temperature, which second temperature is less than the first temperature. Upon contact with the air stream, the condensed water evaporates into the air stream, resulting in a humidified air stream.

19 Claims, 7 Drawing Sheets

METHOD AND APPARATUS FOR HUMIDIFYING AIR WITH WATER VAPOR EXTRACTED FROM MOISTURE-LADEN FLUE GAS

BACKGROUND OF THE INVENTION

1. Field of the Invention

This invention relates to a method and apparatus for humidifying air using the water vapor from moisture-laden flue gas. More particularly, this invention relates to a method and apparatus for humidifying air using a permselective water transport membrane in which water vapor from the moisture-laden flue gas is condensed and the condensed water is transported through the membrane for evaporation into an air stream.

2. Description of Related Art

Methods and apparatuses for the selective removal of one or more components from a gaseous mixture are well-known. U.S. Pat. No. 5,753,009 teaches a method and apparatus for selective removal of one or more components from a multi-component gas/vapor mixture by membrane fractionation. The membrane fractionation gas removal system comprises a feed chamber containing gas/vapor mixture, at least one porous membrane having a first side which contacts the gas/vapor mixture in the feed chamber, at least one non-porous membrane having one side which contacts the second side of the porous membrane, which non-porous membrane has a permeability selective to one or more components of the gas/vapor mixture, an exit chamber connected to the second side of the non-porous membrane such that the component exiting the non-porous membrane enters the exit chamber, and an evacuation member connected to the exit chamber for evacuating one or more components from within the exit chamber. U.S. Pat. No. 4,875,908 teaches a process for selectively separating water vapor from a multi-component gaseous mixture in which the multi-component gaseous mixture comprising the water vapor is passed along and in contact with a membrane which is selectively permeable to water vapor. The use of membranes for selective removal of one or more components of a gaseous mixture is also taught by U.S. Pat. No. 4,583,996 (inorganic porous membrane), U.S. Pat. No. 3,980,605 (fibrous semi-permeable membrane), and U.S. Pat. No. 3,735,559 (sulfonated polyxylylene oxide membranes).

Methods and apparatuses for selective removal of water vapor from a gaseous mixture and condensing the separated water vapor to recover its latent heat of vaporization are also known. U.S. Pat. No. 5,236,474 teaches a process for removing and recovering a condensable vapor from a gas stream by a membrane contactor in which a gas stream containing a condensable vapor is circulated on one side of hollow fiber membranes while cool extraction fluid is circulated on the other side under a total pressure differential. As a result, the condensable vapor in the gas stream is condensed in the gas stream and the condensed vapor, i.e. liquid, permeates the membrane and becomes entrained in the cool extraction fluid. U.S. Pat. No. 6,517,607 B2 teaches a method for removing a condensable component from a process stream in which a first side of a permselective membrane is contacted with a process stream in which is disposed the condensable component. The condensable component is passed through a permselective membrane to a second side of the permselective membrane, forming a condensable permeate. The condensable permeate is then contacted with a liquid stream having a liquid form of the condensable permeate, forming a condensed permeate, which may then be returned to the process which generated process stream.

In colder climates, air within buildings tends to be dry as a result of which humidification is frequently employed to add more moisture to the air to keep people within the building comfortable and to prevent damage to dry-sensitive objects within the building. Conventional means for humidifying air include adding water by spray, atomizers, or distributors. Typically, in a house, a whole house humidifier installed with the furnace is the best way to humidify all the air in the house. A typical residential humidifier requires a water supply to distribute water along a filter such that hot and dry air coming through the filter will evaporate some of the water so that the air can be humidified. To ensure sufficient wetting of the filter and minimize deposition of dissolved minerals on the filter, a portion of the water supplied to the filter is wasted and goes down to the drain.

Typically, 12 gallons per day of water needs to be added to the air for a house with 3000 ft$^2$. Considering the wasted water to the drain, a consumption of 20 gallons per day of water is typical. However, in addition to conventional water supplies, water is also present in the residential gas furnace flue gas. For example, for a typical 110,000 BTU/hour residential gas furnace flue gas, approximately 30.75 gallons of water per day could be available for this purpose. Extraction of 40% of this water could provide about 12.3 gallons per day, which is enough to meet the typical residential air humidification demand. However, flue gas typically contains contaminants which must be prevented from mixing with the water in order to avoid contamination of the building air supply.

SUMMARY OF THE INVENTION

Accordingly, it is one object of this invention to provide a method and apparatus for humidifying air which substantially eliminates the amount of water consumed by conventional systems and methods for humidifying air.

It is another object of this invention to provide a method and apparatus for humidifying air which utilizes the water vapor in flue gas as a water supply for the humidification process.

These and other objects of this invention are addressed by a method for humidifying air in which one side of a permselective water transport membrane is contacted with water vapor-laden flue gas and at least a portion of the water vapor is condensed, producing condensed water which is transported through the membrane to the opposite side of the membrane where it is evaporated into the air to be humidified. By using this membrane separation technique to transfer moisture from the flue gases to the air stream, unwelcome gas components in the flue gas, such as CO, carbon dioxide and nitrogen, are substantially blocked from passing through the membrane layer, thereby preventing contamination of the humidified air. In addition to humidifying the air, during the moisture transport process, the higher temperature flue gas also gives up its heat to the lower temperature air, thereby enabling capture of the energy from the flue gas and increasing efficiency of the air heating and humidification process. Because only pure water transports through the membrane, water contaminant problems that often impact the operation of humidifiers over an extended period of time are avoided. Use of the water from the flue gas in accordance with the method and apparatus of this invention also avoids the cost of installing a water supply line and the cost to regularly replace the filter employed in conventional systems due to mineral deposition build up and microbial growth on the filter.

The method of this invention may be carried out in an apparatus comprising an air stream conduit and a humidification element, referred to herein as a transport membrane humidifier, disposed within the air stream conduit. The transport membrane humidifier comprises a permselective water transport membrane having a flue gas side and an opposite air stream side which is suitable for selectively passing condensed water vapor in flue gas contacting the flue gas side through the permselective water transport membrane to the air stream side of the membrane.

The essence of this invention is the use of the permselective water transport membrane, which is a membrane that allows substantially only condensed water vapor, i.e. liquid water, from the flue gas to pass through selectively, forming a permeate stream of water, while substantially preventing other components of the flue gas from passing through the membrane. By maintaining the temperature of the condensed water vapor above the temperature of the air stream, a portion of the heat from the flue gas also is transferred to the air stream. The driving force for this transfer of heat and mass is the differential partial pressure of the condensable water vapor across the membrane.

BRIEF DESCRIPTION OF THE DRAWINGS

These and other objects and features of this invention will be better understood from the following detailed description taken in conjunction with the drawings wherein.

DETAILED DESCRIPTION OF THE PRESENTLY PREFERRED EMBODIMENTS

The invention disclosed herein is a transport membrane humidifier in which a membrane separation technique is employed to transfer moisture from a flue gas stream to an air stream while blocking other unwelcome gas components in the flue gas from passing through the membrane layer. The driving force for the water vapor to pass through the membrane is the water vapor partial pressure difference between the two streams. That is, the water vapor partial pressure on the flue gas side of the membrane is higher than the water vapor partial pressure on the air stream side of a membrane.

Figure 1:
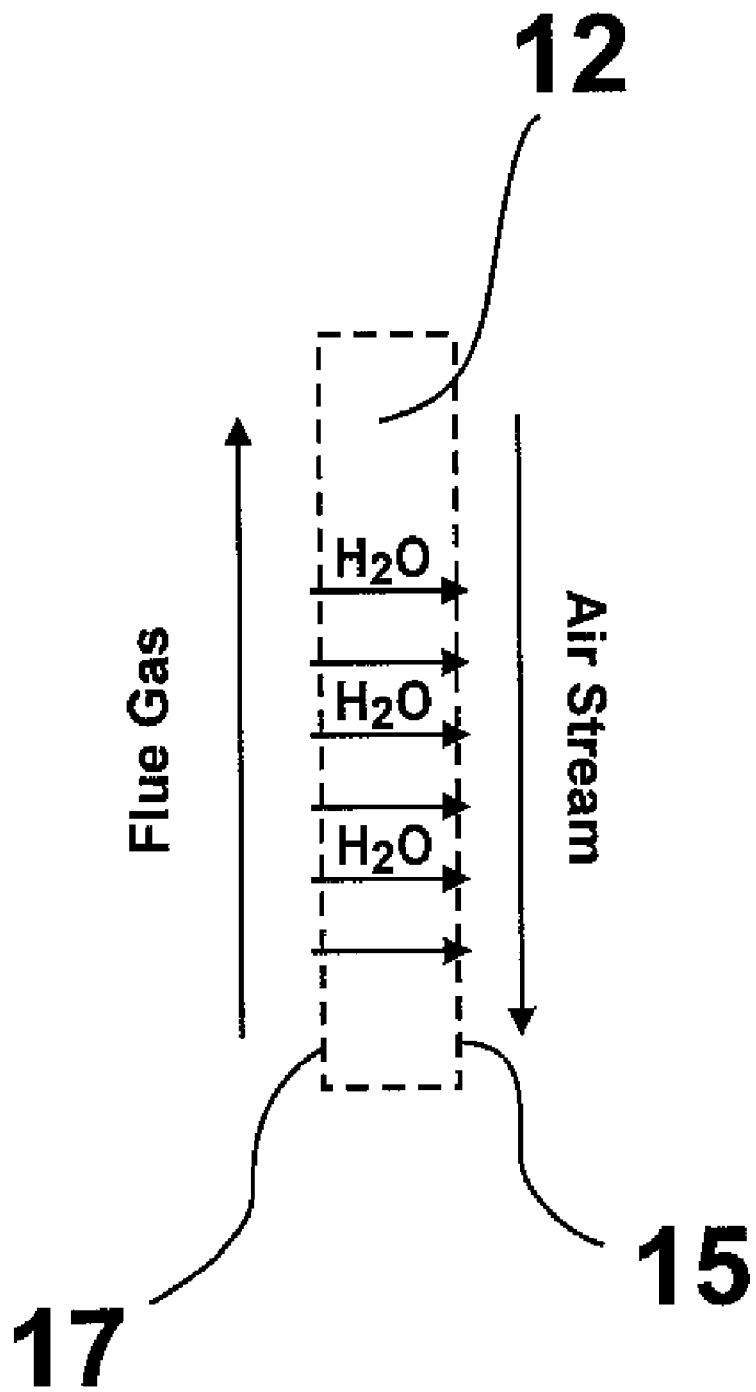
FIG. 1 is a diagram showing the basic concept of this invention.

The basic concept of this invention is shown in FIG. 1. As shown therein, flue gas containing water vapor is provided to the flue gas side 17 of a permselective water transport membrane 12. In accordance with one preferred embodiment, the membrane is porous, having pore sizes no greater than about 50 nanometers (nm). Suitable materials for use as a porous, permselective water transport membrane in accordance with one embodiment of this invention are mesoporous ceramics, such as an alumina ceramic. The water vapor condenses in the pores of the membrane and is transported through the membrane to the air stream side 15 of the membrane. An air stream is provided to the air stream side 15, whereby the condensed water vapor is evaporated into the air stream. During the condensed water vapor transport process, the higher temperature flue gas gives up heat to the lower temperature air stream as both sensible and latent heat, thereby increasing energy efficiency. Because only substantially pure water is transported through the membrane, water contaminant problems that often impact the operation of humidifiers over an extended period of time are avoided. In addition, recycling water from the flue gas also avoids the costs of installing a water supply line and the costs of regularly replacing the filter employed in conventional systems due to mineral deposition buildup and microbial growth on its surface.

Figure 2:
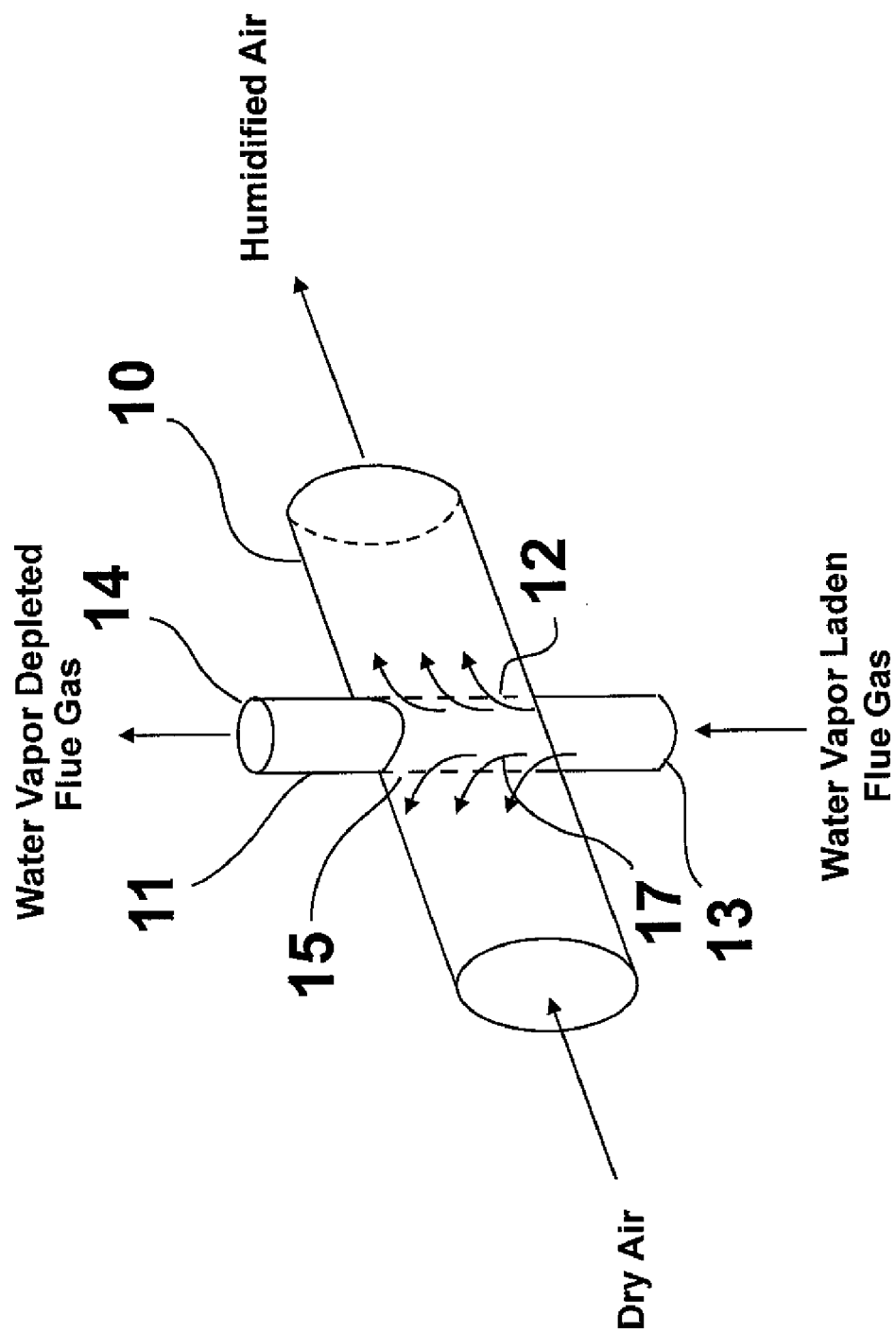
FIG. 2 is a schematic diagram of a transport membrane humidifier in accordance with one embodiment of this invention.

In accordance with one embodiment of this invention as shown in FIG. 2, the transport membrane humidifier comprises a tubular flue gas conduit 11 having a flue gas inlet 13, a flue gas outlet 14 and a porous, permselective water transport membrane 12 having an air side 15 and a flue gas side 17 disposed within a duct or conduit 10. In accordance with one particularly preferred embodiment, the transport membrane humidifier is disposed within the ductwork of a heating, ventilation and air conditioning (HVAC) system. During operation, a dry air stream flows inside duct 10 upstream of the porous, permselective water transport membrane and a water vapor-laden flue gas is introduced into the flue gas inlet 13 of tubular flue gas conduit 11. As the water vapor-laden flue gas contacts the surface on flue gas side 17 of permselective water transport membrane 12, the water vapor condenses within the pores of the membrane, producing liquid water. By virtue of a capillary condensation separation mechanism, the liquid water, and substantially only the liquid water, passes through the membrane to the surface on the air side 15 of the membrane. The dry air flowing through the duct contacts the air side surface of the membrane, resulting in evaporation of the liquid water into the air and humidification thereof. The water vapor depleted flue gas is then exhausted through the flue gas outlet 14 of tubular flue gas conduit 11. Although shown as a tubular structure, it will be appreciated that the method of this invention may be accomplished using a planar permselective membrane, wherein the water vapor laden flue gas contacts one side of the membrane, resulting in condensation of the water vapor in the membrane, and the air stream contacts the opposite side of the membrane resulting in evaporation of the liquid water passed through the membrane into the air stream.

Figure 3:
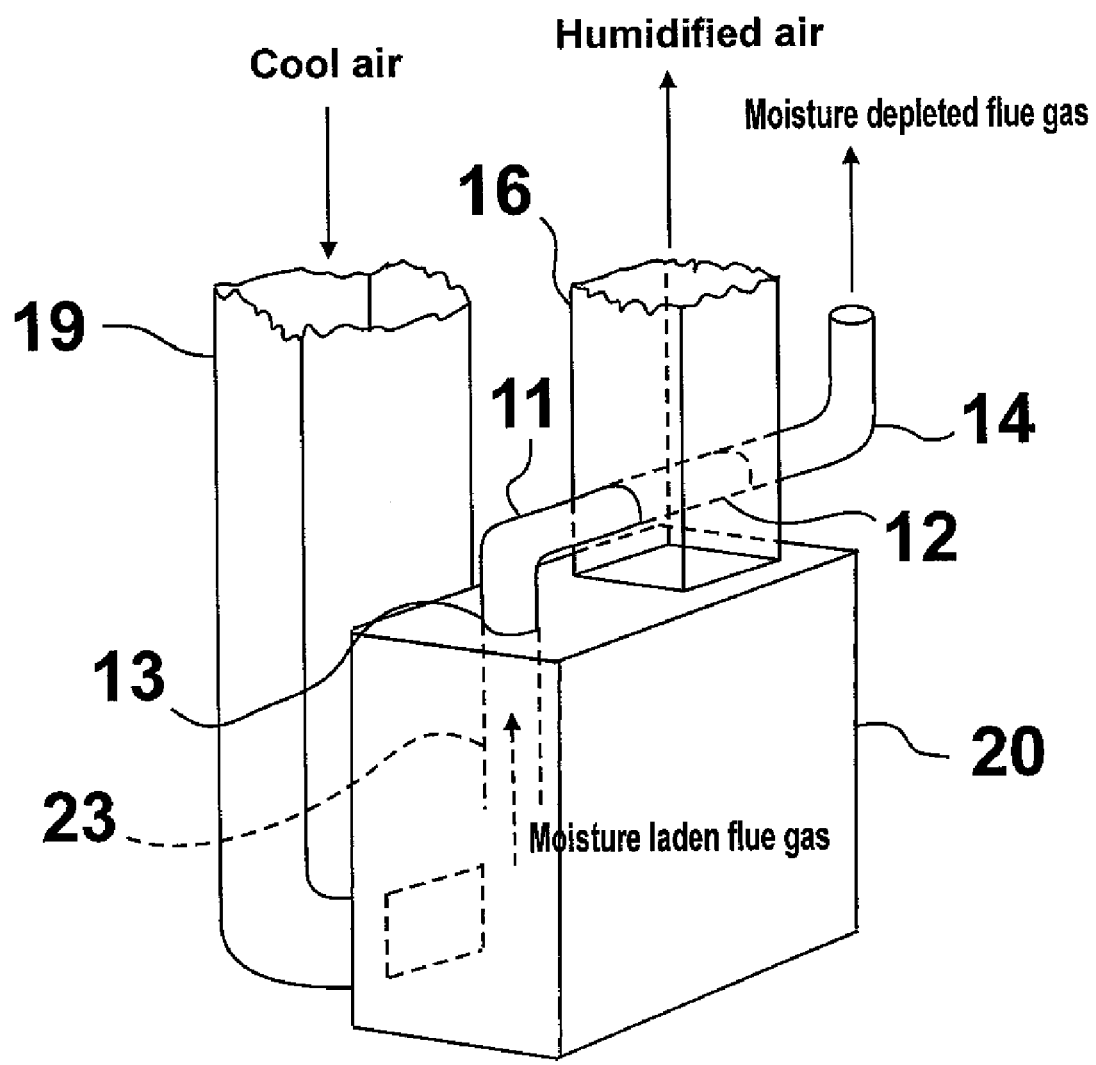
FIG. 3 is a schematic diagram of a heating system employing a transport membrane humidifier in accordance with one embodiment of this invention.

FIG. 3 shows one embodiment of this invention in which the transport membrane humidifier is disposed within the heated air duct, i.e. furnace air outlet ductwork, of a fossil fuel fired heating system. In this embodiment, cool air is introduced through a cool air duct 19 into a furnace 20 in which the cool air is heated, producing heated, dry air. The heated, dry air is transported from the furnace through duct 16, in which is disposed the porous, permselective water transport membrane 12. Flue gas generated by the combustion process in the furnace is exhausted through a flue gas conduit 23 having a flue gas inlet in fluid communication with the furnace and having a flue gas outlet in fluid communication with the flue gas inlet 13 of tubular flue gas conduit 11. In accordance with this embodiment, all of the water vapor laden flue gas flows through the tubular permselective water transport membrane and all of the heated, dry air contacts the outer surface of the membrane, capturing condensed water vapor and heat from the flue gas. This mode of operation provides a potential maximum benefit of air humidification because all of the heated, dry air flows over the permselective water transport membrane. However, because the air ductwork is typically large in size, the porous, permselective water transport membrane must be large in size or consist of multiple, smaller tubular elements to match the size of the ductwork.

Figure 4:
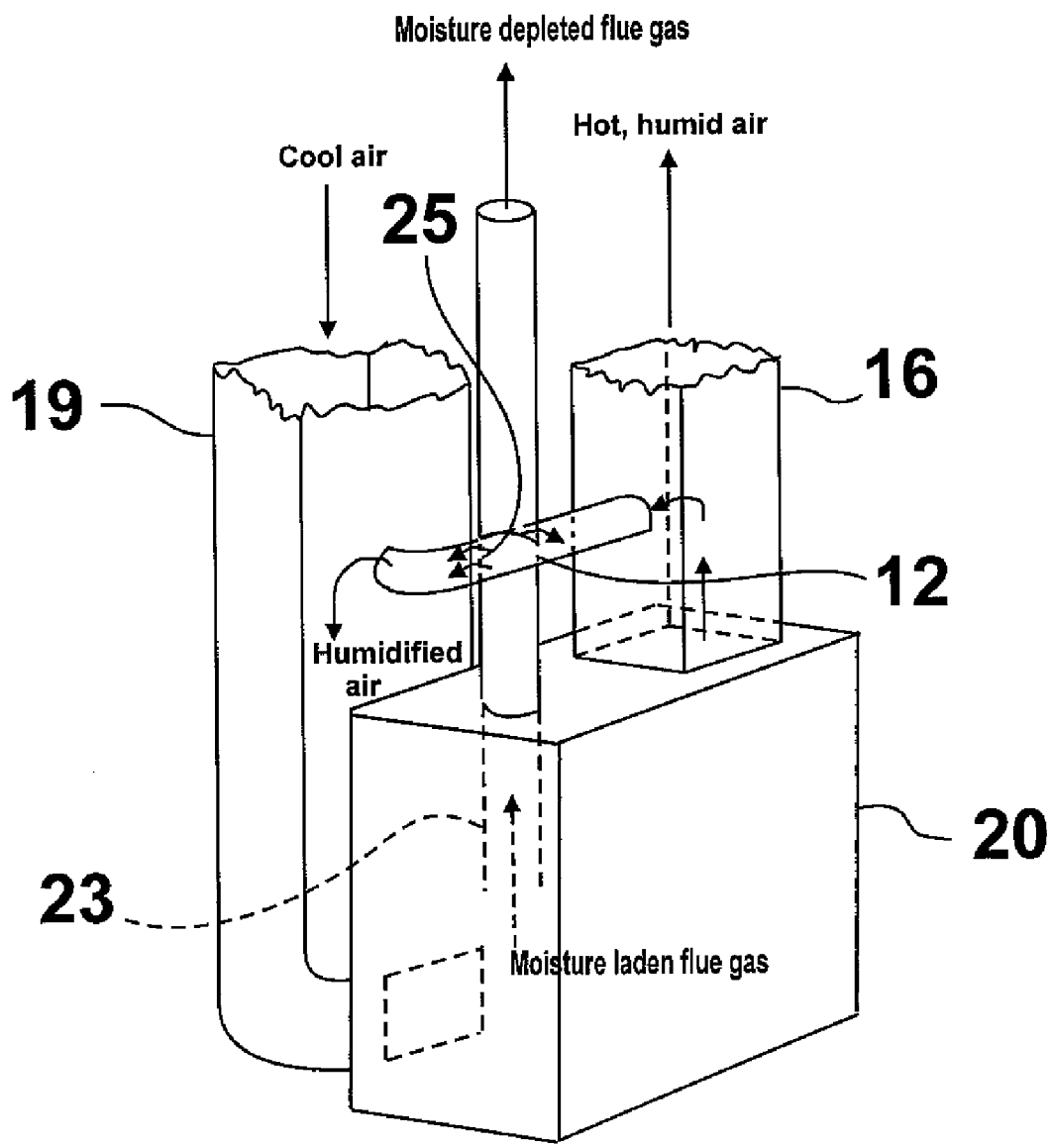
FIG. 4 is a schematic diagram of a heating system employing a transport membrane humidifier in accordance with one embodiment of this invention.

FIG. 4 shows a heating system in accordance with one embodiment of this invention in which the porous, permselective water transport membrane is disposed between and in fluid communication with both the furnace air inlet and outlet ductworks 19 and 16, respectively. In accordance with this embodiment, a portion of the heated air from the furnace 20 is diverted to contact the porous, permselective water transport membrane to capture moisture and heat from the entire flue gas stream which contacts the flue gas side 25 of the porous, permselective water transport membrane 12, but is separated from the hot air stream by a layer of membrane. Because the porous, permselective water transport membrane is disposed outside of the air ducts 16, the size of the membrane may be reduced. However, the efficiency of water and heat transport is lower because only a portion of the air is involved in the water vapor and heat exchange.

Figure 5:
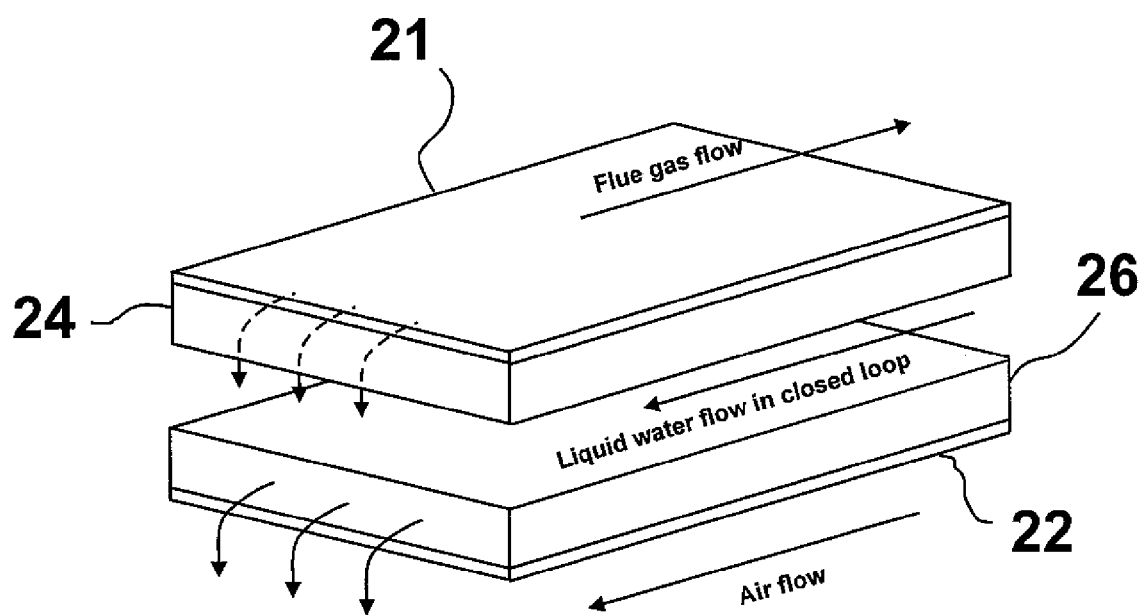
FIG. 5 is a schematic diagram of a transport membrane humidifier in accordance with one embodiment of this invention employing an intermediate medium.
Figure 6:
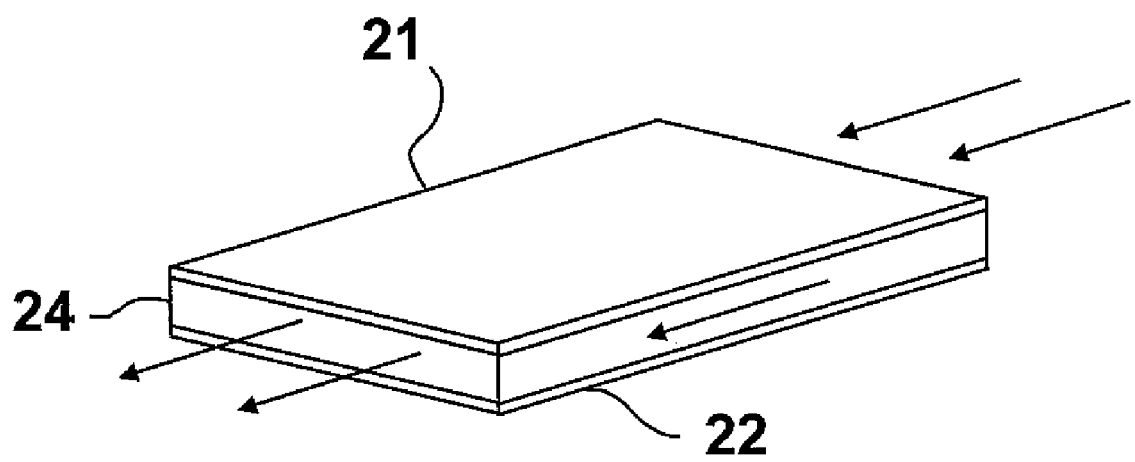
FIG. 6 is a schematic diagram of a composite membrane for a transport membrane humidifier in accordance with one embodiment of this invention.

The extraction of water vapor from flue gas and transport into an air stream may also be accomplished in accordance with one embodiment of this invention through the use of an intermediate medium, such as a constant flow rate of water in a closed loop between two planar layers of membranes 21, 22 as shown in FIG. 5. The advantage of this design is potentially higher water vapor transport efficiency and higher separation. In accordance with one embodiment of this invention, the two layers of membranes 21, 22 are disposed on opposite facing surfaces of porous substrates 24, 26 as shown in FIG. 6.

Figure 7:
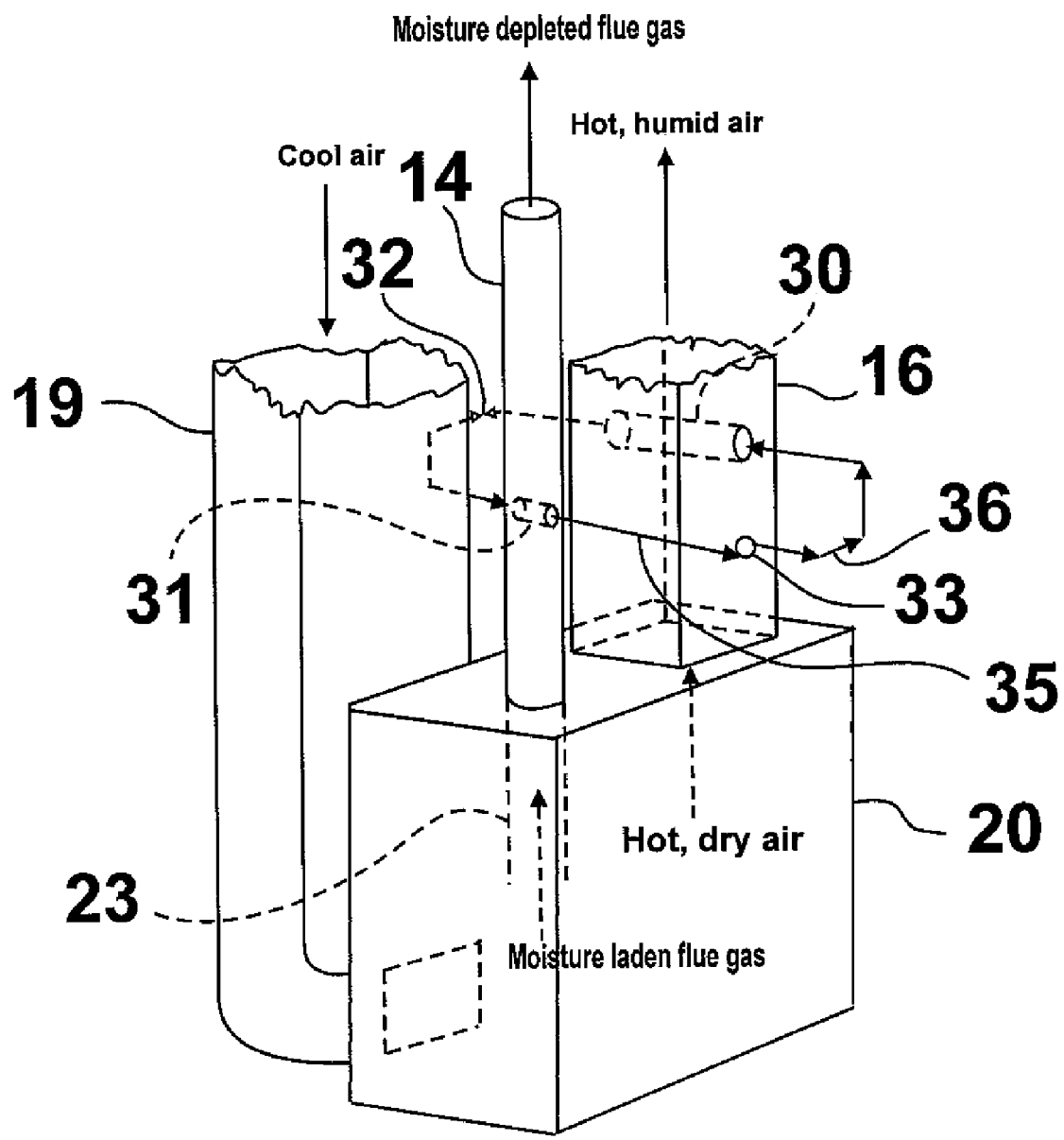
FIG. 7 is a schematic diagram of a heating system employing a transport membrane humidifier in accordance with yet another embodiment of this invention.

FIG. 7 shows a residential heating system employing two porous, permselective water transport membranes 30, 31 in accordance with one embodiment of this invention. As shown therein, one porous, permselective water transport membrane 31 is disposed within flue gas duct 23 and the other porous, permselective water transport membrane 30 is disposed inside hot air duct 16 with a closed loop of water flowing between the two porous, permselective water transport membranes. In accordance with this embodiment, water vapor from the flue gas is transferred through porous, permselective water transport membrane 31, condensing on the water side thereof. The water is transported by means of lines 35, 36 to porous, permselective water transport membrane 30 where it passes through the membrane and evaporates in the air stream flowing through hot air duct 16, resulting in hot, humid air. Operation of this embodiment requires creating lower than atmospheric pressure on the water side of porous, permselective water transport membrane 31 and higher than atmospheric pressure on the water side of porous, permselective water transport membrane 30, which pressures are maintained through the use of water pump 33 and regulating valve 32 disposed in the closed loop.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. A method for humidifying air comprising the steps of: providing a water vapor laden flue gas having a first water vapor partial pressure and a first temperature from a combustion process to a first side of a first permselective liquid water transport membrane;
condensing at least a portion of said water vapor on said first side of said first permselective liquid water transport membrane, producing condensed water;
transporting said condensed water through said first permselective liquid water transport membrane to a second side of said first permselective liquid water transport membrane opposite said first side;
providing a room air stream having a second water vapor partial pressure less than said first water vapor partial pressure and having a second temperature less than said first temperature to said second side of said first permselective liquid water transport membrane; and
evaporating said condensed water into said room air stream, producing humidified room air.

2. The method of claim 1, wherein said flue gas is at a higher temperature than said room air stream, whereby a portion of heat energy from said flue gas is transferred to said room air stream.

3. The method of claim 1, wherein said combustion process is carried out in a furnace of a forced air HVAC system.

4. The method of claim 1, wherein said first permselective liquid water transport membrane is in a form of a tube with said first side comprising an interior surface of said tube and said second side comprising an exterior surface of said tube.

5. The method of claim 1, wherein said first permselective liquid water transport membrane is a porous membrane having pore sizes less than 50 nm or equal to about 50 nm.

6. The method of claim 5, wherein dew points of said water vapor laden flue gas and said room air stream and pore size of said first porous, permselective liquid water transport membrane are such as to allow capillary condensation separation to occur within said first porous, permselective liquid water transport membrane.

7. The method of claim 1, wherein a second permselective liquid water transport membrane is disposed on said second side of said first permselective liquid water transport membrane and is spaced apart from said first permselective liquid water transport membrane, and a liquid stream is flowing between said first and second permselective liquid water transport membranes, forming a mixture of said condensed water and said liquid stream.

8. The method of claim 7, wherein a portion of said mixture is transported through said second permselective liquid water transport membrane and evaporated into said room air stream.

9. The method of claim 7, wherein said first and second permselective liquid water transport membranes are connected with opposite facing surfaces of at least one porous substrate disposed between said first and second permselective liquid water transport membranes.

10. An apparatus for humidification of heated room air comprising:
a flue gas source providing water vapor laden flue gas having a first water vapor partial pressure;
a room air stream source having a second water vapor partial pressure less than said first water vapor partial pressure; and
at least one permselective liquid water transport membrane disposed between said water vapor laden flue gas and said room air stream.

11. The apparatus of claim 10, wherein said flue gas source is a furnace of an HVAC system.

12. The apparatus of claim 10, wherein said at least one permselective liquid water transport membrane is a tubular membrane having a water vapor laden flue gas inlet end and a water vapor depleted flue gas outlet end.

13. The apparatus of claim 10, wherein said at least one permselective liquid water transport membrane is a planar structure.

14. The apparatus of claim 10 further comprising a second permselective liquid water transport membrane spaced apart from said at least one permselective liquid water transport membrane and disposed between said water vapor laden flue gas and said room air stream.

15. The apparatus of claim 14, wherein said permselective liquid water transport membranes are disposed on opposite sides of a porous substrate disposed between said permselective liquid water transport membranes.

16. The apparatus of claim 10, wherein said at least one permselective liquid water transport membrane is disposed within a room air duct of an HVAC system.

17. The apparatus of claim 11 further comprising an additional permselective liquid water transport membrane, said at least one permselective liquid water transport membrane disposed in a flue gas exhaust duct connected with a flue gas outlet of said furnace, and said additional permselective liquid water transport membrane disposed within a heated air outlet duct connected with a heated air outlet of said furnace, said at least one permselective liquid water transport membrane in fluid communication with said additional permselective liquid water transport membrane.

18. The apparatus of claim 11, wherein said HVAC system comprises at least one flue gas exhaust duct having a flue gas inlet in fluid communication with a flue gas outlet of said furnace, at least one room air duct having a room air outlet in fluid communication with a room air inlet of said furnace, at least one heated air duct having a heated air inlet in fluid communication with a heated air outlet of said furnace, and at least a portion of said at least one flue gas exhaust duct formed by said at least one permselective liquid water transport membrane, said at least one permselective liquid water transport membrane disposed within a connecting duct having a heated air inlet in fluid communication with said at least one heated air duct and a humidifying air outlet in fluid communication with said at least one room air duct.

19. The apparatus of claim 10, wherein said at least one permselective liquid water transport membrane is a porous membrane having pore sizes less than 50 nm or equal to about 50 nm.

\* \* \* \* \*